Feb. 11, 1958     J. C. ULFELDT     2,822,620
GAUGE FOR MEASURING INSIDE DIAMETERS
Filed Dec. 27, 1954     2 Sheets-Sheet 1
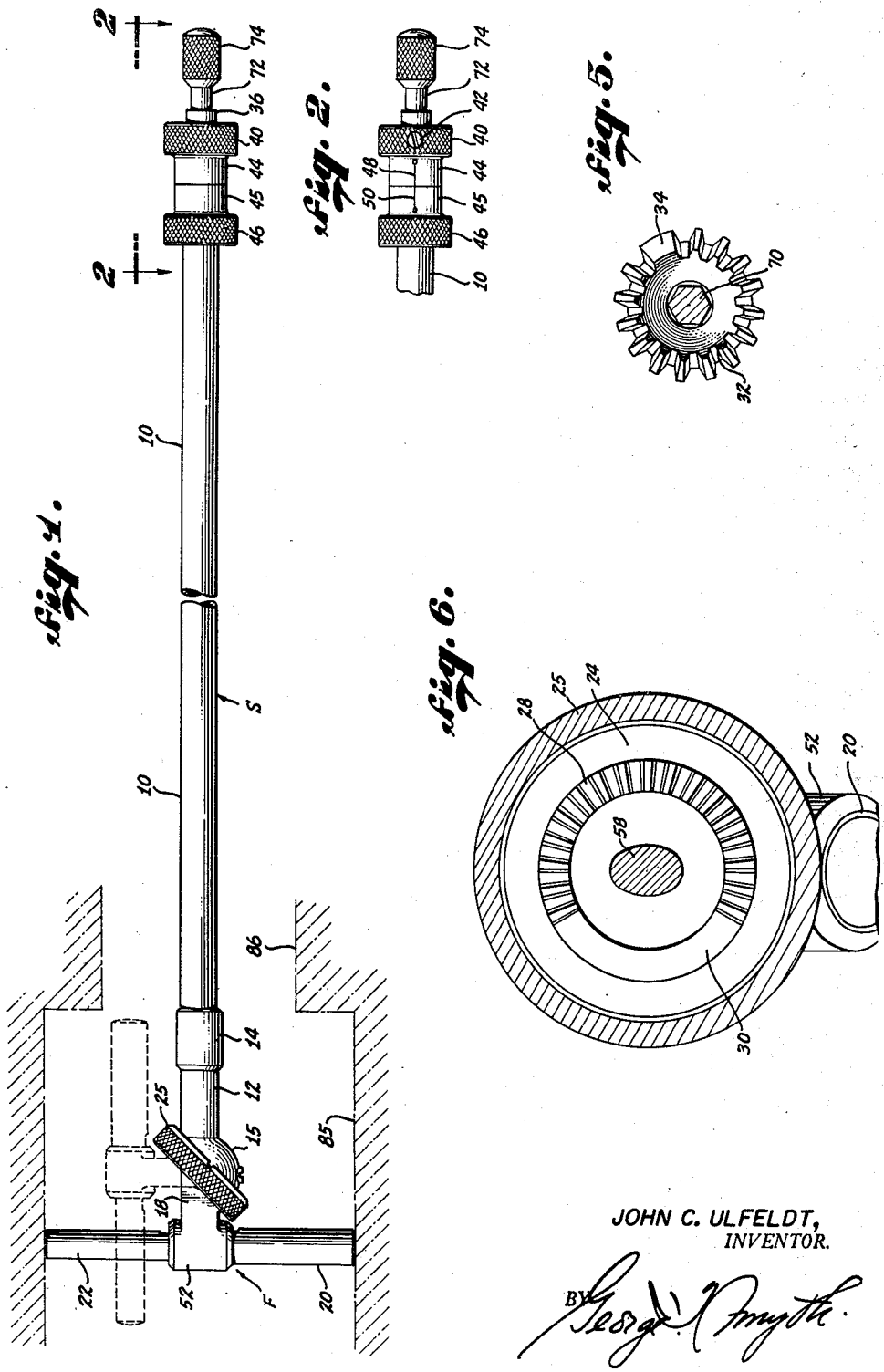
JOHN C. ULFELDT,
INVENTOR.
ATTORNEY.

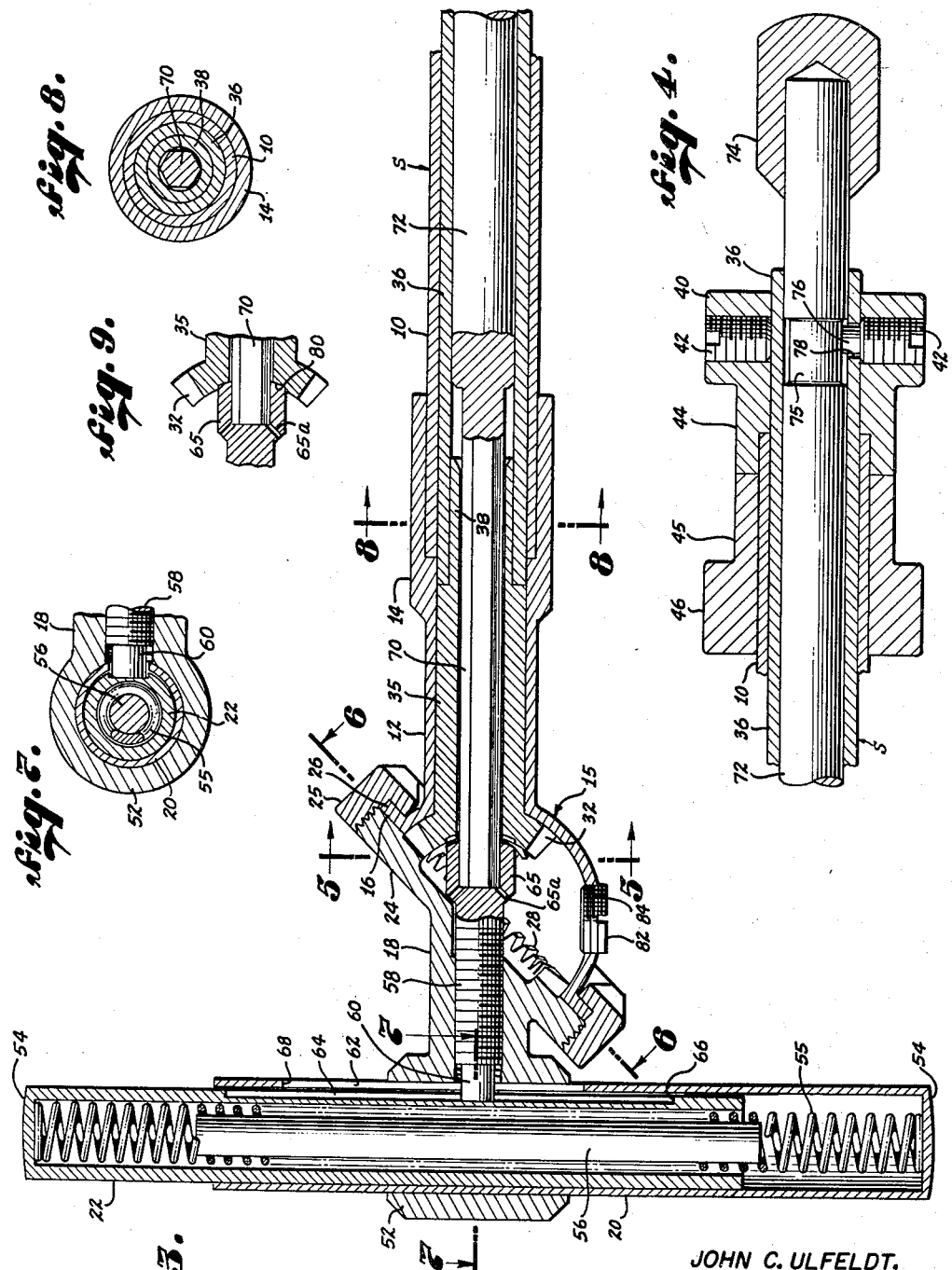

United States Patent Office 2,822,620
Patented Feb. 11, 1958

2,822,620

GAUGE FOR MEASURING INSIDE DIAMETERS

John C. Ulfeldt, Los Angeles, Calif.

Application December 27, 1954, Serial No. 477,628

16 Claims. (Cl. 33—143)

This invention relates to a gauge or inside caliper for measuring the inside diameter of a bore or the like and has a special utility for measuring the inside diameter of a bore that has a restricted entrance.

The problem to which the invention is directed is to provide a gauge that may be inserted through the restricted entrance of the bore and then may be expanded to measure the inside diameter of the bore with a high degree of accuracy. One solution for this problem is to mount a laterally expansible feeler means on a suitable shank member with means on the shank member operatively connected with the feeler means to indicate the extent of expansion of the feeler means while the feeler means is in measuring contact with inner circumferential surface of the bore. Such a solution is not satisfactory, however, because of the difficulty of contriving an indicating means that will convey accurate measurement data from the remote feeler means. Any looseness, lost motion or backlash in the indicating mechanism of such an arrangement is fatal to high accuracy and, of course, wear on the feeler surfaces also destroys accuracy.

In general, the invention solves this problem by mounting an expansible feeler assembly on a shank member with provision for releasably fixing the feeler assembly at whatever length to which it may expand and with further provision for, in effect, folding the fixedly expanded feeler assembly back on the shank member to permit the shank member with the folded feeler assembly to be withdrawn through the restricted entrance of the bore. The fixedly expanded feeler assembly is then measured for length by suitable caliper means to obtain the desired inside diameter measurement of the bore hole with exceedingly high accuracy. There is no indicating mechanism whatsoever to introduce error, and error from wear is completely eliminated by directly calipering the over-all length of the fixedly expanded feeler assembly immediately after each measuring contact with the inner wall surface of the bore.

A feature of the preferred practice of the invention is the concept of mounting a feeler assembly on the end of the shank member to fold relative thereto by rotation about an axis at an acute angle to the shank member. This feature permits the feeler assembly to be folded by simple rotation and such rotation may be achieved by manual rotation of what may be termed a first operating means extending along the shank member to the feeler assembly.

The preferred feeler assembly is T-shaped with two lateral arms mounted on a stem portion for radial extension relative thereto. The two arms comprise two telescoped tubular members with a suitable coiled spring confined therein to urge the two members outward longitudinally away from each other. Suitable releasable clamp means mounted in the stem portion of the feeler assembly is adapted to releasably fix or immobilize the two arms against expansion and contraction at any overall length to which they may be expanded or contracted within the range of measurement of the two arms. What may be termed a second operative means extends along the shank member to operate the clamp means at the measuring or unfolded position of the feeler assembly.

The two telescoped tubular members forming the two arms are removably held to the stem portion of the feeler assembly and can be removed for substitution with like but different capacity telescoping arms. This permits a larger range of bore sizes to be handled with the gauge of the present invention.

A further feature of the preferred practice of the invention is the concept of causing the clamp means at its release position to block movement of the feeler assembly out of its measuring position. Thus when the feeler assembly is expanded in a bore hole to measure the inside diameter of the bore hole the feeler assembly cannot be folded back on the shank member unless it is first securely fixed in length at the dimension of the measured diameter. This feature eliminates any error that may arise from inadvertent failure to tighten the clamping means securely when a diameter measurement is taken.

The various features and advantages of the invention will be apparent from the following detailed description considered with the accompanying drawings.

In the drawings, which are to be regarded as merely illustrative:

Figure 1 is a side elevation of the presently preferred embodiment of the gauge showing the gauge in measuring position inside a bore hole that has a restricted entrance;

Figure 2 is a fragmentary side elevation of the handle portion of the gauge as viewed along the line 2—2 of Figure 1;

Figure 3 is an enlarged longitudinal section of the operating end of the gauge;

Figure 4 is a similar view of the handle end of the gauge;

Figure 5 is a face view of a beveled gear of the gauge mechanism as seen along the line 5—5 of Figure 3;

Figure 6 is a sectional view along the line 6—6 of Figure 3 showing a second beveled gear of the gauge mechanism;

Figure 7 is a fragmentary longitudinal section taken as indicated by the line 7—7 of Figure 3;

Figure 8 is a transverse section taken as indicated by the line 8—8 of Figure 3; and Figure 9 is a fragmentary section similar to Figure 3 showing a modified form of beveled gear that may be used in the invention.

Figure 1 illustrating the preferred embodiment of the invention, shows an inside caliper or T-shaped feeler assembly F mounted on the leading end of a shank member S. The feeler assembly F is foldable on the end of the shank member S from a transverse measuring position shown in solid lines in Figure 1 to a longitudinal folded position outlined in broken lines. The feeler assembly F may be constructed and mounted in various ways for this folding action but, as heretofore stated, preferably is mounted on the shank member for rotation about an inclined axis for this purpose.

The shank member S may comprise a relatively long metal tube 10 and a tubular fitting 12 mounted on the leading end thereof. As best shown in Figure 3, the tubular fitting 12 has an enlarged end 14 that is telescoped over the end of the metal tube 10 and is suitably bonded thereto, for example by brazing. The other end of the tubular fitting 12 is enlarged to form a hemispherical seat 15 which is flanged to provide a suitable annular bearing surface 16 for the feeler assembly F. The axis of the hemispherical seat 15 i. e. the axis of curvature of the annular bearing surface 16, is inclined at an acute angle relative to the axis of the shank member S.

The T-shaped feeler assembly F has a stem portion 18 and a diametrical pair of arms 20 and 22 that are adapted for expansion and contraction in overall length. The stem portion 18 of the feeler assembly is provided with an integral circular base 24 that is rotatably mounted on the hemispherical seat 15 coaxially thereof. The axis of the circular base 24 is inclined at an acute angle relative to the stem portion 18 of the feeler assembly and this acute angle together with the previously mentioned acute angle of the hemispherical seat 15 may total substantially 90°. Preferably each of the two acute angles is approximately 45°.

The circular base 24 slidingly rests against the annular bearing surface 16 for rotation relative thereto and may be held in place by a keeper ring 25 that is threaded onto the circular base as shown in Figure 3. The keeper ring slidingly engages the underside of a peripheral flange 26 of the hemishperical seat 15 to hold the circular base in coaxial position.

Any suitable means may be provided to rotate the base 24 of the feeler assembly F on the hemispherical seat 15. In the present embodiment of the invention, what may be termed a first operating means provided for that purpose comprises suitable gears inside the hemispherical seat together with tubular means extending through the shank member S for operation of the gears. In the construction shown, a segmental gear 28 having a blank portion 30 is integral with the underside of the feeler assembly base 24 and it is in mesh with a second segmental beveled gear 32 having a blank portion 34. The second segmental gear 32 is spherically curved to fit against the wall of the hemispherical seat 15 and is integral with a tubular member 35 that is rotatably mounted inside the shank member S. The tubular member 35 is unitary with an inner tube 36. In the construction shown, the tubular member 35 has an inner end portion 38 that telescopes into the inner tube 36 and is bonded thereto, for example, by brazing.

The inner tube 36 extends beyond the handle end of the shank member S and carries an annular knurled knob 40 which is anchored thereto by a pair of set screws 42 (Figure 4). The knurled knob 40 has a tubular shank 44 which may abut a similar tubular shank 45 of a stationary knurled knob 46 that embraces the shank member S and is suitably bonded thereto, for example by brazing.

It is apparent that rotation of the knurled knob 40 relative to the fixed knurled knob 46 will actuate the segmental beveled gear 32 for rotation of the feeler assembly F on the hemispherical seat 15. 180° of rotation of the circular base 24 on the hemispherical seat 15 will move the T-shaped feeler assembly F from its measuring position shown in full lines in Figure 1 to its folded position shown in broken lines. The blank portions of the segmental gears 28 and 32 cooperate to limit the rotation of the circular base 24 to this range. Thus at each end of this range of 180° the blank portion 34 of the segmental gear 32 abuts the blank portion 30 of the segmental gear 28. While these two limit positions may be detected by feeling the resistance to hand rotation of the knob 40, preferably suitable index means is provided for visual indication of the unfolded or measuring position of the feeler assembly F. For this purpose, an index mark 48 (Figure 2) may be placed on the shank 44 of the rotatable knurled knob 40 to register with a similar index mark 50 on the shank 45 of the stationary knurled knob 46 when the feeler assembly F is in its transverse measuring position shown in full lines in Figure 1.

Furthermore, the index marks 48 and 50 when aligned are used to indicate that the feeler arms 20 and 22 are vertically disposed which insures more accurate gauging. This is important for it will be remembered that these feeler arms will be in many instances not visible to the user of the gauge when inserted with the bore undergoing measurement.

As best shown in Figure 3, the stem portion 18 of the feeler assembly F is integral with a transverse sleeve 52 and the two feeler arms 20 and 22 are movably mounted in this sleeve. The two feeler arms 20 and 22 comprise a pair of slidingly telescoped tubular members having outer end walls 54, the outer tubular arm 20 being slidingly mounted in the transverse sleeve 52 and the inner tubular arm 22 being slidingly mounted in the tubular arm 20. Preferably suitable yielding means is confined by the two tubular arms 20 and 22 to urge the two arms outward in opposite directions towards their outer limit positions relative to each other. For this purpose, a coiled spring 55 may be confined in compression between the two end walls 54. Preferably a suitable pin 56 is mounted inside the coiled spring 55 to support the spring in its collapsing or compressing movement and prevent buckling thereof as the arms move together.

As heretofore stated, it is contemplated that a second operating means will be provided that will releasably fix or clamp the two feeler arms 20 and 22 selectively relative to each other to maintain any given inside diameter measurement and, of course, such a second operating means must not prevent the folding and unfolding operation of the feeler assembly by the first operating means.

In the present embodiment of the invention, the second operating means includes a suitable clamping screw 58 that is threaded axially into the stem portion 18 of the feeler assembly to exert pressure against the two tubular feeler arms 20 and 22 laterally thereof. The clamping screw 58 terminates in a tip 60 of reduced diameter that extends through a slot 62 in the outer tubular arm 20 and into a keyway 64 in the inner tubular arm 22. It is apparent that when the clamping screw 58 is tightened, the tip 60 presses the inner tubular feeler arm 22 diametrically towards the surrounding outer tubular arm 20 and thus presses both of the two arms diametrically against the inner circumferential surface of the sleeve 52. Thus the clamping screw 58 may be tightened to immobilize the two arms 20 and 22 relative to each other and relative to the surrounding sleeve 52. The head of the clamping screw 58 is positioned inside the hemispherical seat 15 and is in the form of a hexagonal socket 65. Preferably the screw head is positioned to back against the face of the segmental beveled gear 32, as may be seen in Figure 3.

Figure 3 shows the clamping screw 58 in its tightened position at which it clamps or immobilizes the two tubular arms 20 and 22 relative to each other. When the clamping screw is retracted from this position to release the two tubular arms 20 and 22 for longitudinal expansion movement by the enclosed spring 55, the socket head 65 of the screw backs against the beveled gear 32.

The range of longitudinal movement of the clamping screw 58 is relatively small and is such that the tip 60 of the clamping screw stays within the keyway 64 of the inner tubular arm 22 throughout the range. Thus the tip 60 of the clamping screw coacts with the keyway and serves as a stop to limit the outward expansion of the two tubular arms 20 and 22 relative to each other, the end wall 66 of the keyway abutting the screw tip 60 at the outer limit position of the inner tubular arm 22 and the end wall 68 of the slot 62 abutting the screw tip 60 at the outer limit position of the second tubular arm 20.

The second operating means for releasably immobilizing the two feeler arms 20 and 22 relative to each other further includes a hexagonal rod 70 that is slidably and rotatably mounted inside the shank member S for cooperation with the socket head 65 of the clamping screw 58. This hexagonal rod 70 is integral with a round rod 72, being a longitudinal extension thereof, and the round rod extends beyond the previously mentioned inner tube 36. The exposed end of the round rod 72 carries a suitable knurled knob 74 by means of which the round rod and the hexagonal rod 70 may be manipulated for both rotation and longitudinal movement.

Preferably suitable means is provided to limit longitudinal movement of the round rod 72. For this purpose, the periphery of the round rod may be cut away to provide a circumferential groove 75 of appropriate width and one of the set screws 42 may be formed with a tip 76 (Figure 4) of reduced diameter to extend through an aperture 78 in the inner tube 36 into the circumferential groove 75.

It is apparent that the knob 74 may be manipulated to shift the end of the hexagonal rod 70 into and out of the socket head 65 of the clamping screw 58 and may be manipulated for rotation to tighten and loosen the clamping screw. It is further apparent that when the hexagonal rod 70 is retracted out of engagement with the socket head 65 of the clamping screw 58 the T-shaped feeler assembly F is free to rotate from its transverse measuring position to its alternate folded position.

A feature of the preferred practice of the invention is the concept of dimensioning the clamping screw 58 in overall length to back against the beveled gear 32 as soon as the clamping screw is retracted sufficiently to release the two feeler arms 20 and 22 for longitudinal expansion. When the clamping screw 58 is backed into abutment with the beveled gear 32 it offers frictional resistance to rotation of the feeler assembly out of its measuring position. Any attempt to rotate the beveled gear 32 for moving the feeler assembly F to its folded position increases the frictional resistance of the clamping screw, since such rotation tends to be transmitted to the clamping screw in a direction to back the clamping screw tighter against the beveled gear. If desired, the beveled gear 32 may be formed with a slight recess 80 as shown in Figure 9 to receive the retracted socket head 65 of the clamping screw thereby to lock the feeler assembly in a positive manner.

The virtue of arranging for the retracted clamping screw 58 to interfere with the folding action of the feeler assembly in this manner is that it forces the operator to tighten the clamping screw securely before the feeler assembly is moved out of its measuring position to its longitudinal folded position. Thus the invention prevents any error arising from inadvertent failure to tighten the clamping screw in a secure manner. If the clamping screw were not thoroughly tightened, there would be the possibility of slippage between the two feeler arms 20 and 22 in the course of the procedure of folding the feeler assembly and withdrawing the feeler assembly from the bore hole.

Preferably the hemispherical seat 15 is provided with a closure member in the form of a screw plug 82 that threads into a circular aperture 84. As shown in Figure 1, the screw plug 82 is in alignment with the stem portion 18 of the feeler assembly F at the folded position of the assembly and thus is in alignment with the clamping screw 58. It is apparent that with the feeler assembly F in its folded position, the screw plug 82 may be removed for access to the clamping screw.

Thus once the screw plug 82 is removed, a small tool such as an Allan wrench can be inserted through the opening 84 and engaged in the socket head 65 for rotating the screw 58 to longitudinally retract the tip 60 thereof from the keyway 64 and slot 62 to permit the telescoping arms to be bodily removed from the sleeve 52. It will now be seen that the two arms are demountably carried by the gauge and can be removed for substitution with like but different capacity arms. Thus, a relatively wide range of bore sizes may be accurately gauged with the tool of the present invention by supplying a set of interchangeable telescoping arms of different capacities.

It should be mentioned here that the housing formed by the hemispherical seat 15, the base 24 and keeper ring 25 is filled with a suitable lubricant or grease and the lubricant retained by the screw 82 which forms a filler plug as will be understood and holding the rod 70 out of the same. To prevent grease from filling the socket 65 it is now preferred to form the same with passages 65a through which grease will extrude as the rod 70 for example, is moved into the socket in the use of the gauge.

The manner in which the invention serves its purpose may be readily understood from the foregoing description. Figure 1 for example, shows a bore 85 having an entrance 86 of restricted cross-sectional dimension. In preparation for measuring the inside diameter of the bore 85 the operator manipulates the knob 40 of the first operating means to place the feeler assembly F in lateral unfolded position, and manipulates the knob 74 to loosen the clamping screw 58 by means of the hexagonal rod 70 thereby to release the two feeler arms 20 and 22. The operator then manually contracts the two feeler arms 20 and 22 with one hand and with the other hand manipulates the knob 74 to tighten the clamping screw 58 for the purpose of holding the two feeler arms retracted. The knob 74 is then manipulated to withdraw the hexagonal rod 70 from the socket head 65 of the tightened clamping screw to free the feeler assembly for folding action. The operator then again rotates the knob 40 of the first operating means to rotate the feeler assembly to its folded position.

With the feeler assembly F both contracted and folded, the operator inserts the shank member S with the folded feeler assembly through the restricted entrance 86 into the bore hole 85 and then rotates the knob 40 of the first operating means to rotate the feeler assembly to its unfolded measuring position. The operator makes sure that the index line 48 on the shank of the knob 40 registers with the stationary index mark 50 to show that the feeler assembly is in its limit measuring position and that the arms 20, 22 are vertical. The operator then manipulates the knob 74 of the second operating means to insert the hexagonal rod 70 into the socket head 65 and rotates the knob to unscrew and retract the clamping screw 58. The retraction of the clamping screw 58 frees the two feeler arms 20 and 22 and the coiled spring 55 promptly extends the two arms into pressure contact with the inner circumferential surface of the bore 85.

The operator then manipulates the knob 74 to reengage the hexagonal rod 70 with the socket head 65 and tightens the clamping screw. The knob 74 is then manipulated to withdraw the hexagonal rod 70 from the socket head of the clamping screw and the knob 40 of the first operating means is manipulated to fold the feeler assembly. If the operator does not thoroughly tighten the clamping screw, he will sense resistance to the rotation of the knob 40 for the folding action and will thereby be reminded to tighten the clamping screw thoroughly.

It will be noted that the outer end of the two feeler arms 20 and 22 are suitably rounded to permit the two arms to be rotated to the folded position of the feeler F without any binding action that would tend to compress the two arms and thus result in a false measurement. With the feeler assembly folded, the operator withdraws the gauge from the bore hole through the restricted entrance 86 and applies an outside caliper or equivalent measuring device to ascertain the overall length of the fixedly clamped arms 20 and 22 of the feeler head assembly, this overall length being the true inside diameter of the bore 85.

Although the now preferred embodiment of the present invention has been shown and described herein, it is to be understood that the invention is not to be limited thereto, for it is susceptible to changes in form and detail within the scope of the appended claims.

I claim:

1. In a gauge of the character described for measuring the inside diameter of a bore hole, the combination of: a shank member having a leading end; a feeler assembly mounted on the leading end of said shank member for movement thereon between a folded position to permit the gauge to be inserted into the bore hole and a second unfolded position extending transversely of the shank, said feeler assembly being expansible in its unfolded position for measuring the inside diameter of the bore hole; yielding means to expand said feeler assembly; a first operating means carried by said shank member for manipulation to move said feeler assembly between its two positions without affecting the state of expansion of the feeler assembly; and a second operating means carried by said shank member for manipulation to releasably immobilize said feeler assembly against expansion by said yielding means, whereby, with the feeler assembly in its unfolded position in measuring contact with the inner circumferential surface of the bore hole, said second operating means may be manipulated to fix the measuring dimension of the feeler assembly and then said first operating means may be manipulated to fold the feeler assembly for withdrawal from the bore hole and for subsequent measurement to ascertain the inside diameter of the bore hole.

2. A combination as set forth in claim 1 in which said feeler assembly is mounted on said shank member for rotation on an axis inclined at an acute angle from the axis of the shank member for movement between said two positions; and in which said first operating means rotates the feeler assembly about said inclined axis.

3. A combination as set forth in claim 1 in which said second operating means comprises a first member movably mounted on said shank member and a second separate member movably mounted on said feeler assembly, said two members being operatively engageable with each other at said unfolded measuring position of the feeler assembly to fix the length of the feeler assembly at whatever measuring length it may assume or to release the feeler assembly for expansion and contraction, said two members being disengageable from each other to permit the feeler assembly to be moved to its folded position.

4. A combination as set forth in claim 3 in which said second member is movable by said first member between an effective position fixing the measuring dimension of said feeler assembly and a second position releasing the feeler assembly for expansion and contraction; and in which said second member at its second position resists movement of said feeler assembly from its measuring position to its folded position.

5. A combination as set forth in claim 1 in which said shank member and said first operating means are provided with index means to indicate when said feeler assembly is at its unfolded measuring position.

6. A combination as set forth in claim 1 in which said first and second operating means are coaxial with each other.

7. In a gauge of the character described for measuring the inside diameter of bore holes, the combination of: a hollow shank member having a leading end forming a hollow circular seat with the axis of the circular seat at an acute angle to the shank member; a T-shaped feeler assembly having a stem portion and a pair of feeler arms extending transversely at 90° therefrom, said feeler arms being expansible and contractable in overall length to measure inside diameters of the bore holes, the stem portion of said feeler assembly having a base mounted on said seat for rotation about said axis, the axis of said base being at an acute angle from said stem portion, said two angles totaling substantially 90° whereby said feeler assembly is rotatable between a folded position and an unfolded measuring position, at which unfolded position the shank member and said stem portion are in alignment with each other; means in said feeler assembly extending through said shank portion operable to releasably immobilize said feeler arms against expansion and contraction thereby to releasably fix the overall length of the two arms at measured inside diameters of bore holes; operating means carried by said shank member for manipulation to rotate said feeler assembly on said seat; and operating means carried by said shank member and extending into said hollow seat for manipulation to actuate said immobilizing means.

8. A combination as set forth in claim 7 in which said operating means for rotation of the feeler assembly is mounted in said shank longitudinally thereof and includes gears inside said hollow seat for rotation of said feeler assembly.

9. A combination as set forth in claim 7 in which said operating means for actuating said immobilizing means extends through the operating means that rotates the feeler assembly.

10. A combination as set forth in claim 7 in which said operating means for actuating said immobilizing means is longitudinally movable into and out of operating engagement with the immobilizing means, whereby the operating means may be manipulated to immobilize said arms at the unfolded measuring position of the feeler assembly and may then be longitudinally retracted out of engagement with said immobilizing means to permit rotation of the feeler assembly to its folded position.

11. A combination as set forth in claim 7 in which said hollow seat has a removable closure in alignment with said stem portion at the folded position of the feeler assembly for access to said immobilizing means.

12. A combination as set forth in claim 7 in which said feeler assembly includes yielding means to expand said pair of feeler arms into contact with the wall of a bore hole.

13. A combination as set forth in claim 12 in which one of said arms telescopes over the other arm with said yielding means inside the two arms; and in which said immobilizing means is in the form of a screw to exert clamping pressure on the two telescoped arms.

14. A combination as set forth in claim 13 in which said screw means extends through a longitudinal slot in the outer arm into contact with the inner arm to press the inner arm in one diametrical direction against the outer arm.

15. A combination as set forth in claim 14 in which said screw means in its retracted release position engages the wall of said seat to resist rotation of said feeler assembly out of its measuring position.

16. In a gauge of the character described for measuring the inside diameter of bore holes, the combination of: a tubular shank member having a leading end forming a hollow circular seat having its axis at an acute angle to the shank members; a T-shaped feeler assembly having a stem portion and a pair of feeler arms extending transversely at 90° therefrom, said feeler arms being expansible and contractable in overall length to measure inside diameters of bore holes, the stem portion of said feeler assembly having a base mounted on said seat for rotation about said inclined axis, the axis of said base being at an acute angle from said stem portion, said two angles totaling substantially 90° whereby said feeler assembly is rotatable between a folded position and an unfolded measuring position, at which unfolded measuring position the shank member and said stem portion are in alignment with each other; a gear in said hollow circular seat integral with said base; a second gear in said seat in mesh with said first mentioned gear; a tubular operating means rotatably mounted in said shank coaxially thereof in operative engagement with said second gear, said operating means having a portion exposed for manipulation to rotate said feeler assembly between its two positions; yielding means in said feeler assembly to expand said two arms radially outward from said stem portion for measuring the inside diameters of bore holes; rotatable means in said feeler assembly extending through said shank portion to releasably immobilize said feeler arms against expansion and contraction thereby to releasably fix the overall length of the two arms at measured inside diameters of bore holes; and an operating member mounted in said operating means coaxially thereof for operative engagement with said immobilizing means, said operating member having a portion extending outside of said operating means for manual manipulation, said operating member being movable longitudinally for retraction out of engagement with said immobilizing means to permit movement of said feeler assembly out of its unfolded measuring position.

References Cited in the file of this patent

UNITED STATES PATENTS

| | | |
|---|---|---|
| 2,546,154 | Gardner | Mar. 27, 1951 |

FOREIGN PATENTS

| | | |
|---|---|---|
| 9,106 | Great Britain | June 27, 1887 |
| 633,638 | Germany | July 31, 1936 |